United States Patent
Yoshioka et al.

(10) Patent No.: US 12,515,995 B2
(45) Date of Patent: Jan. 6, 2026

(54) ALUMINUM NITRIDE STRUCTURE AND METHOD FOR PRODUCING SAME

(71) Applicant: Panasonic Intellectual Property Management Co., Ltd., Osaka (JP)

(72) Inventors: Tatsuro Yoshioka, Osaka (JP); Natsuki Sato, Osaka (JP); Naoki Kurizoe, Osaka (JP); Ryosuke Sawa, Osaka (JP); Tohru Sekino, Osaka (JP); Tomoyo Goto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 129 days.

(21) Appl. No.: 17/913,207

(22) PCT Filed: Dec. 18, 2020

(86) PCT No.: PCT/JP2020/047458
§ 371 (c)(1),
(2) Date: Sep. 21, 2022

(87) PCT Pub. No.: WO2021/199521
PCT Pub. Date: Oct. 7, 2021

(65) Prior Publication Data
US 2023/0127313 A1 Apr. 27, 2023

(30) Foreign Application Priority Data
Mar. 30, 2020 (JP) ................................ 2020-059958

(51) Int. Cl.
*C04B 35/581* (2006.01)
*C04B 35/626* (2006.01)
*C04B 35/645* (2006.01)

(52) U.S. Cl.
CPC ........ *C04B 35/581* (2013.01); *C04B 35/6264* (2013.01); *C04B 35/645* (2013.01); *C04B 2235/3217* (2013.01); *C04B 2235/3865* (2013.01); *C04B 2235/656* (2013.01); *C04B 2235/77* (2013.01); *C04B 2235/85* (2013.01)

(58) Field of Classification Search
CPC . C04B 35/581; C04B 35/6264; C04B 35/645; C04B 2235/3217; C04B 2235/3865; C04B 2235/656; C04B 2235/77; C04B 2235/85; C04B 38/0074; C04B 2235/3218; C04B 2235/663; C04B 2235/96; C04B 35/62813; C04B 35/6303; C04B 2235/604; C04B 2235/80; C01P 2002/72; C01P 2004/03; C01B 21/0728
See application file for complete search history.

(56) References Cited

U.S. PATENT DOCUMENTS

| | | | |
|---|---|---|---|
| 2016/0104876 A1 | 4/2016 | Avison et al. | |
| 2017/0012264 A1* | 1/2017 | Carlson | H01G 11/20 |
| 2017/0129816 A1* | 5/2017 | Deville | C04B 35/64 |

FOREIGN PATENT DOCUMENTS

JP 2019-064844 A 4/2019

OTHER PUBLICATIONS

IP.com English Translation for Park et al (KR 20160124725 A) (Year: 2016).*
Extended European Search Report for corresponding EP Application No. 20929104.6 issued Aug. 29, 2023.
International Search Report for corresponding Application No. PCT/JP2020/047458, mailed Feb. 9, 2021.
Written Opinion for corresponding Application No. PCT/JP2020/047458, mailed Feb. 9, 2021.
Tamai, H. et al., Hydrothermal corrosion and strength degradation of aluminum nitride ceramics, J. Am. Ceram. Soc., 2000, vol. 83, No. 12, pp. 3216-3218, ISSN 0002-7820.
S. Hirai et al., "Effect of Temperature on Hydration of AlN Powder", Journal of the Japan Institute of Metals and Materials, vol. 59, No. 11 (1995) pp. 1143-1148, with English Abstract (cited in specification).

* cited by examiner

*Primary Examiner* — Nathan L Van Sell
(74) *Attorney, Agent, or Firm* — Renner, Otto, Boisselle & Sklar, LLP

(57) ABSTRACT

Provided is an aluminum nitride structure that includes a plurality of aluminum nitride particles, wherein aluminum nitride particles that are adjacent are bound to each other through a boehmite phase containing boehmite, and the porosity is 30% or less. Also provided is a method for producing an aluminum nitride structure that includes: obtaining a mixture by mixing an aluminum nitride powder with a solvent containing water; and pressurizing and heating the mixture under conditions of a pressure of 10 to 600 MPa and a temperature of 50 to 300° C.

14 Claims, 11 Drawing Sheets

FIG. 3
(a)
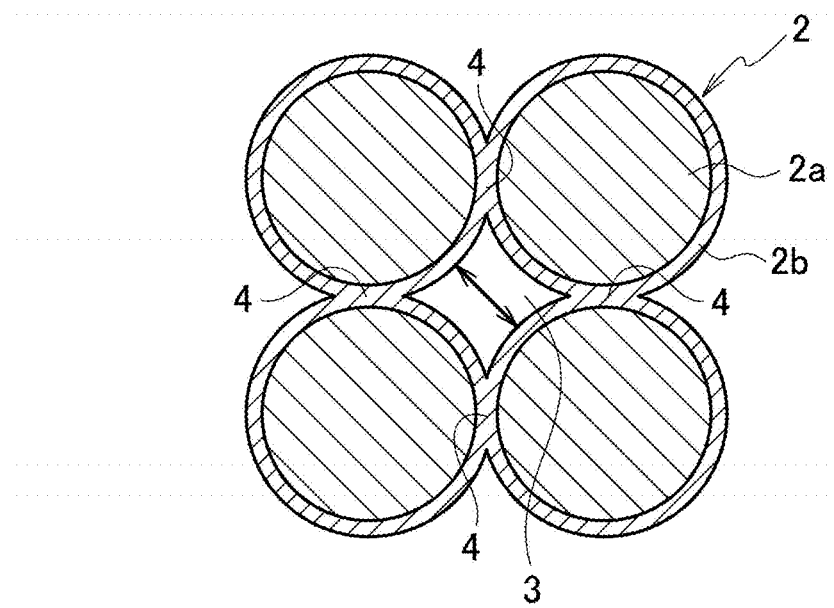
(b)
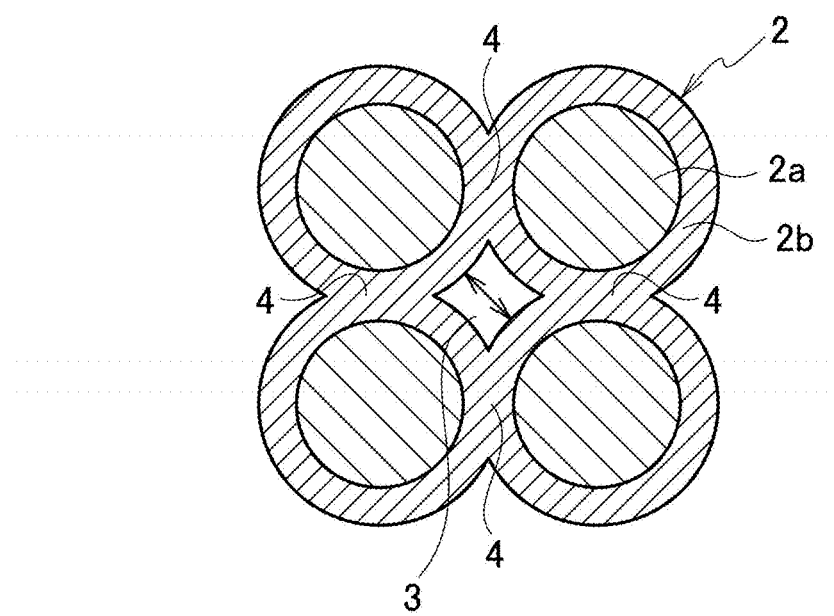

FIG. 4
(a)
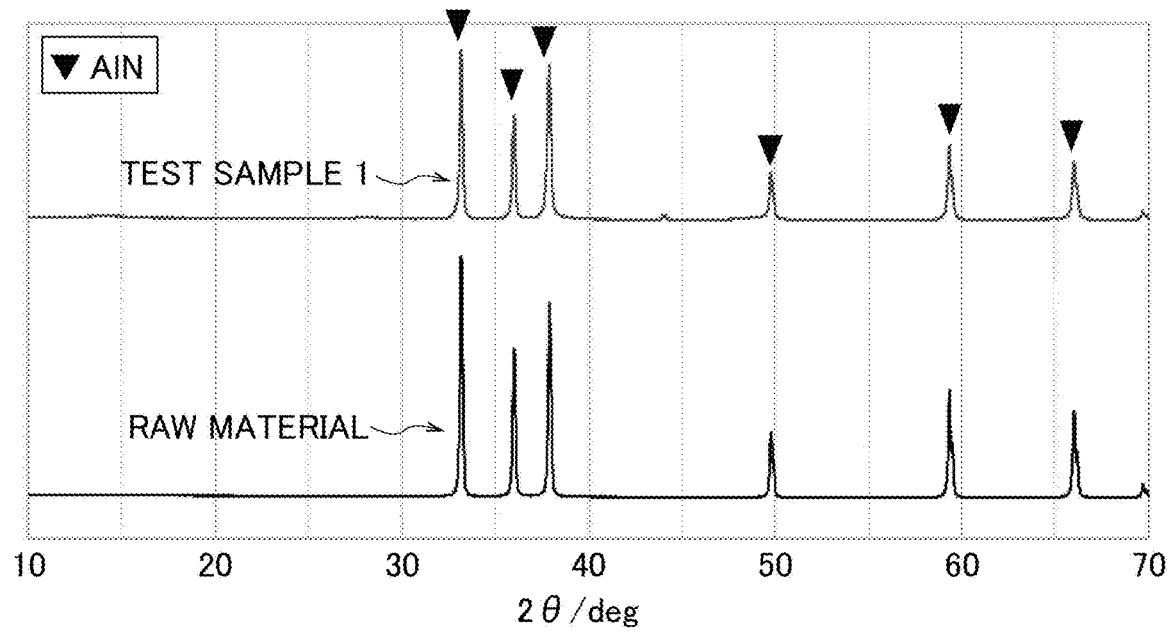
(b)
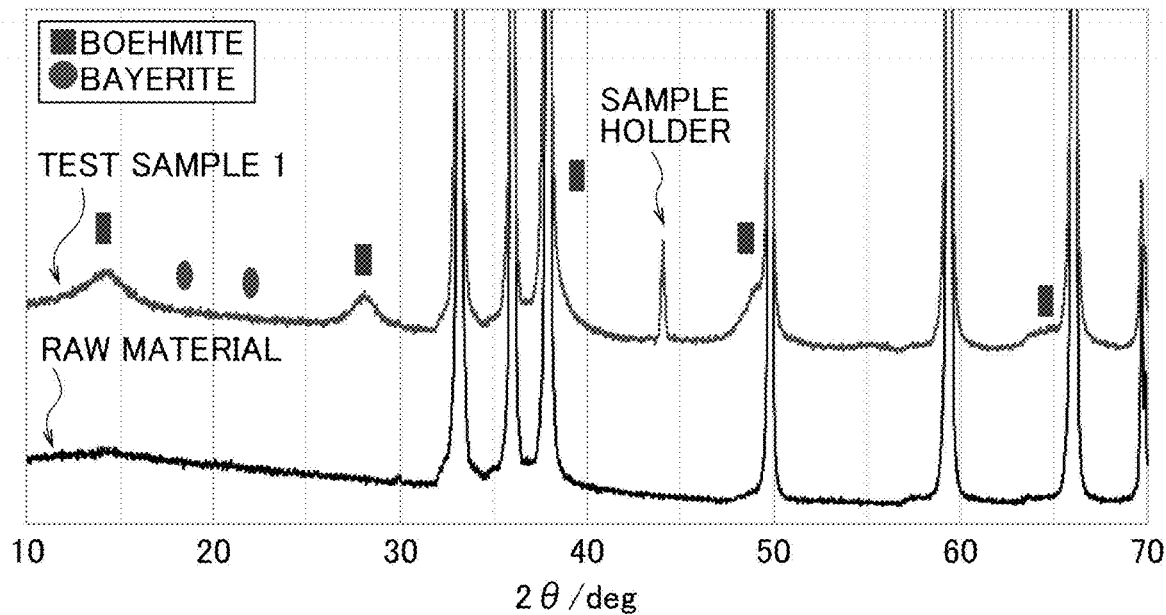

FIG. 8
(a)
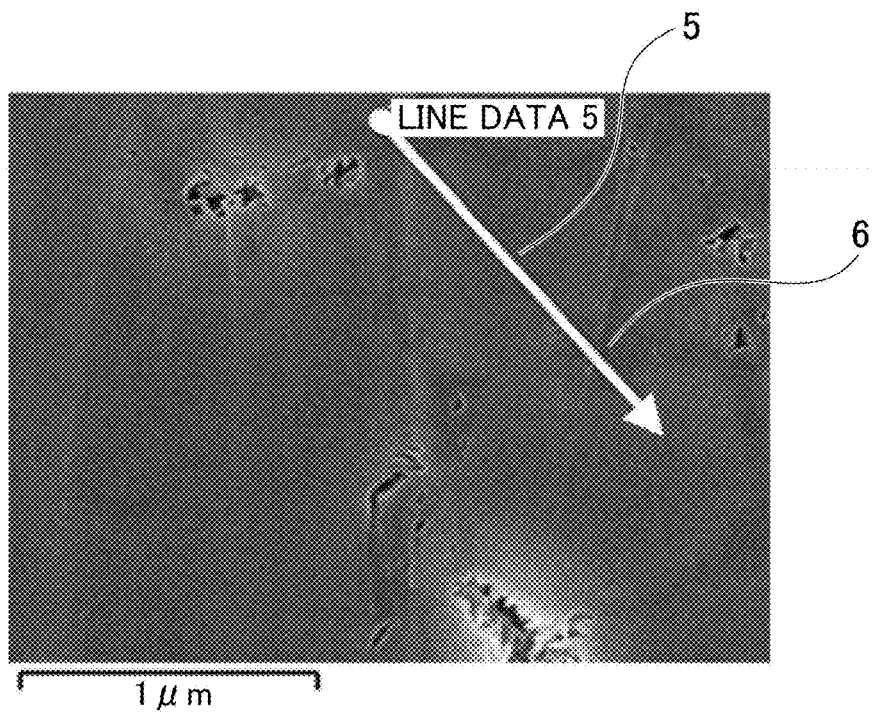
(b)
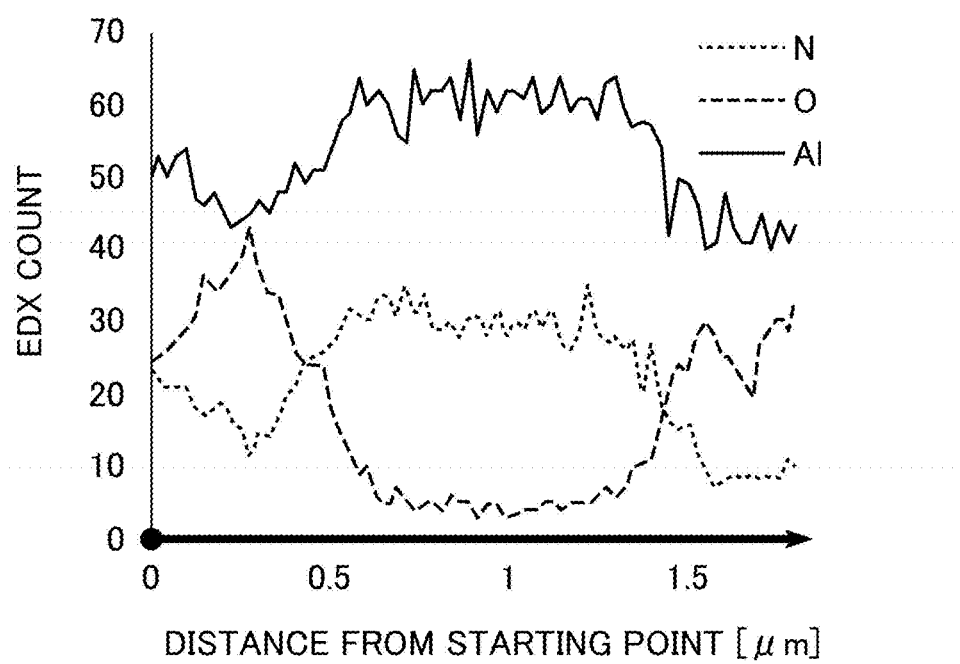

FIG. 11
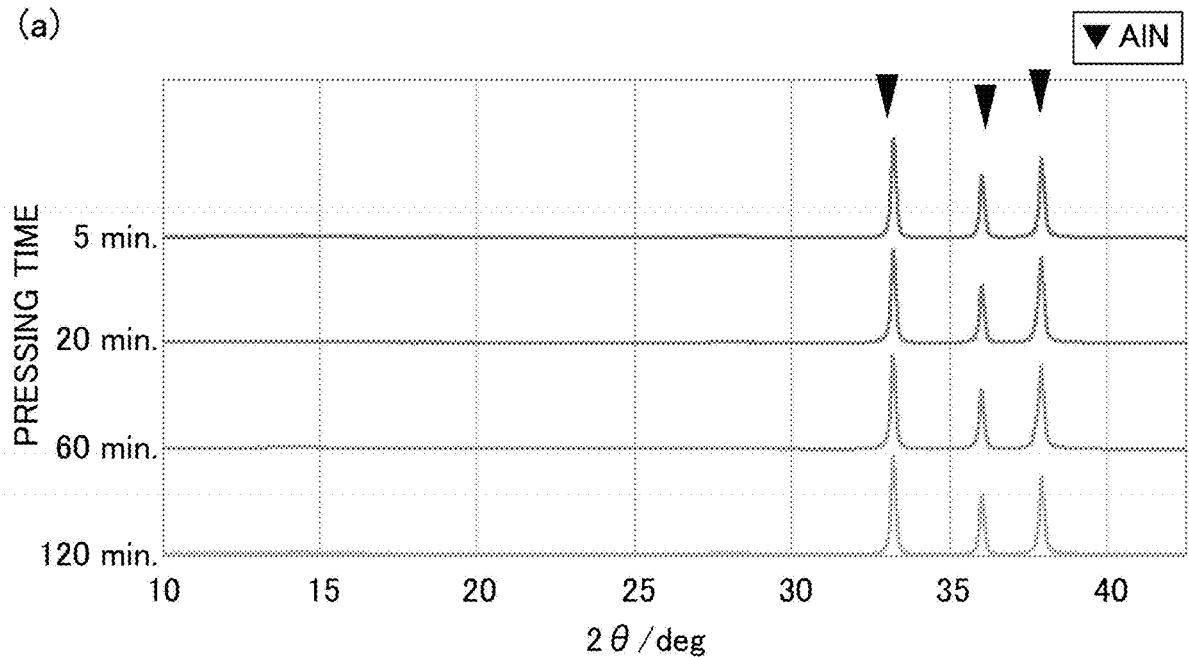
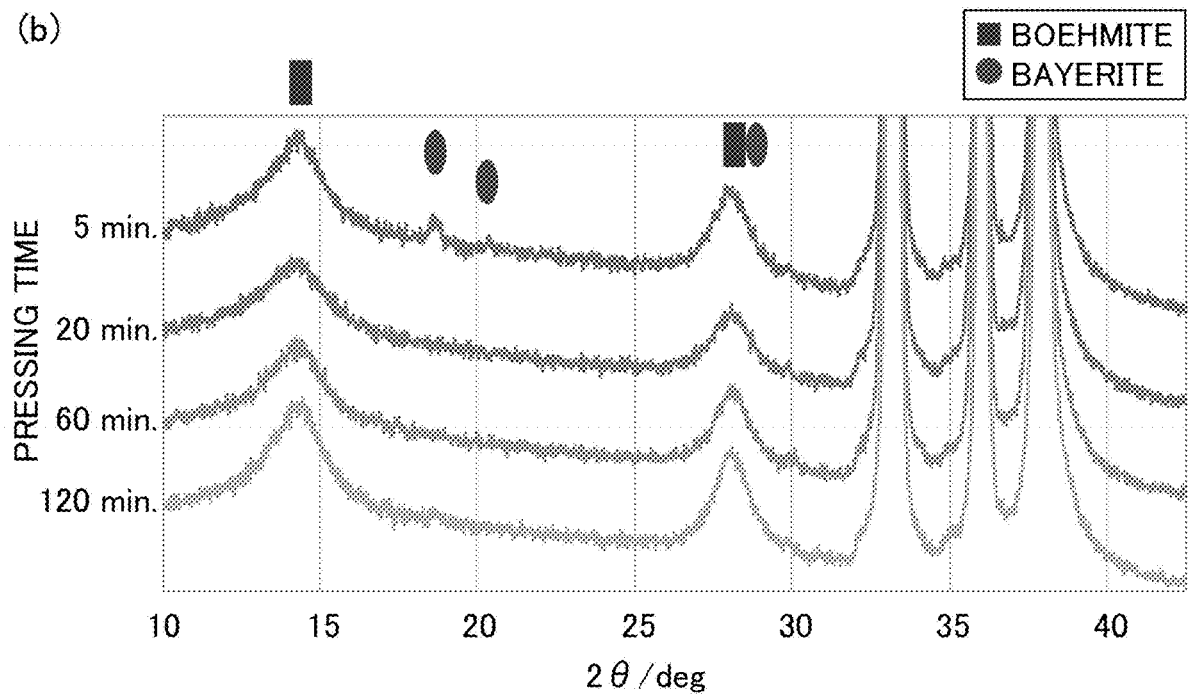

FIG. 12
(a)
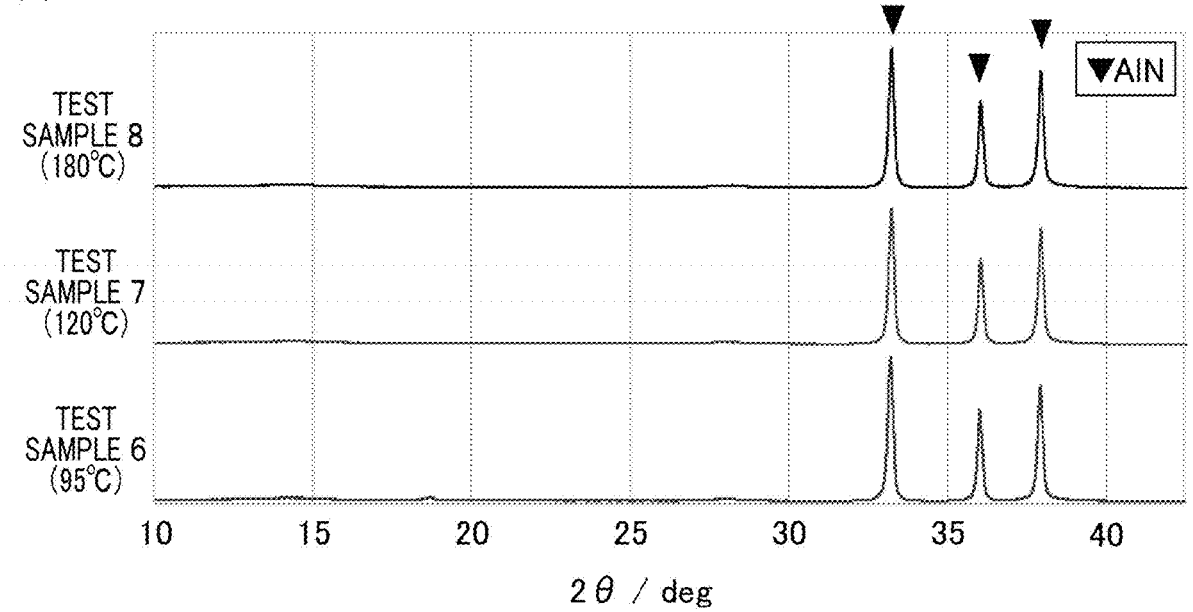
(b)
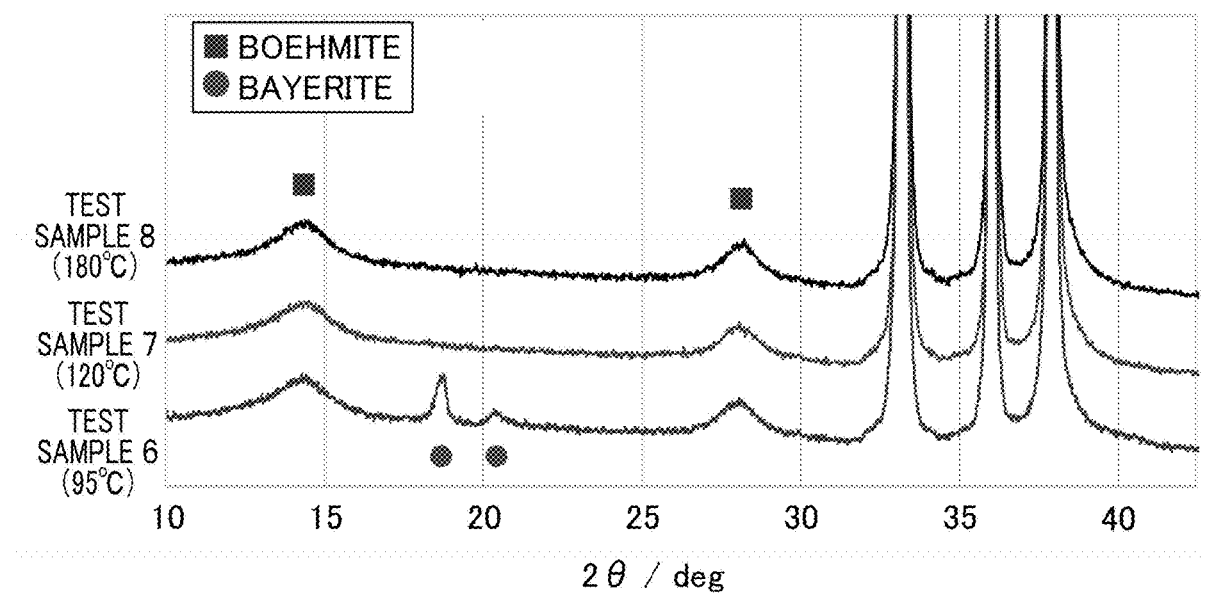

FIG. 13
(a)
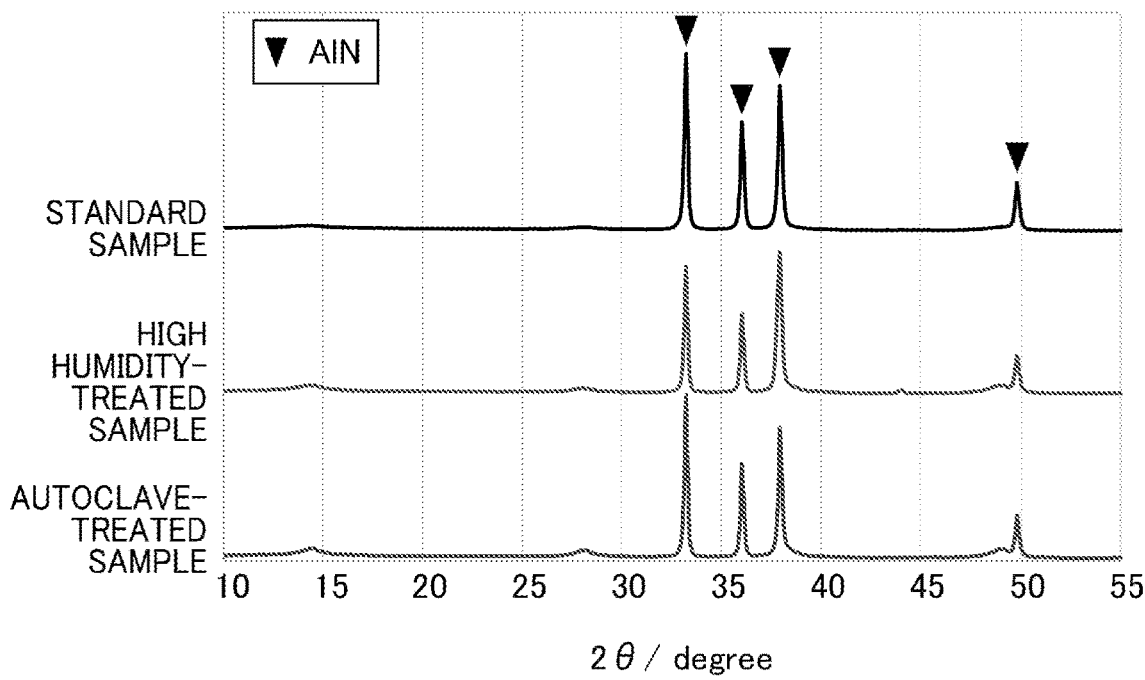
(b)
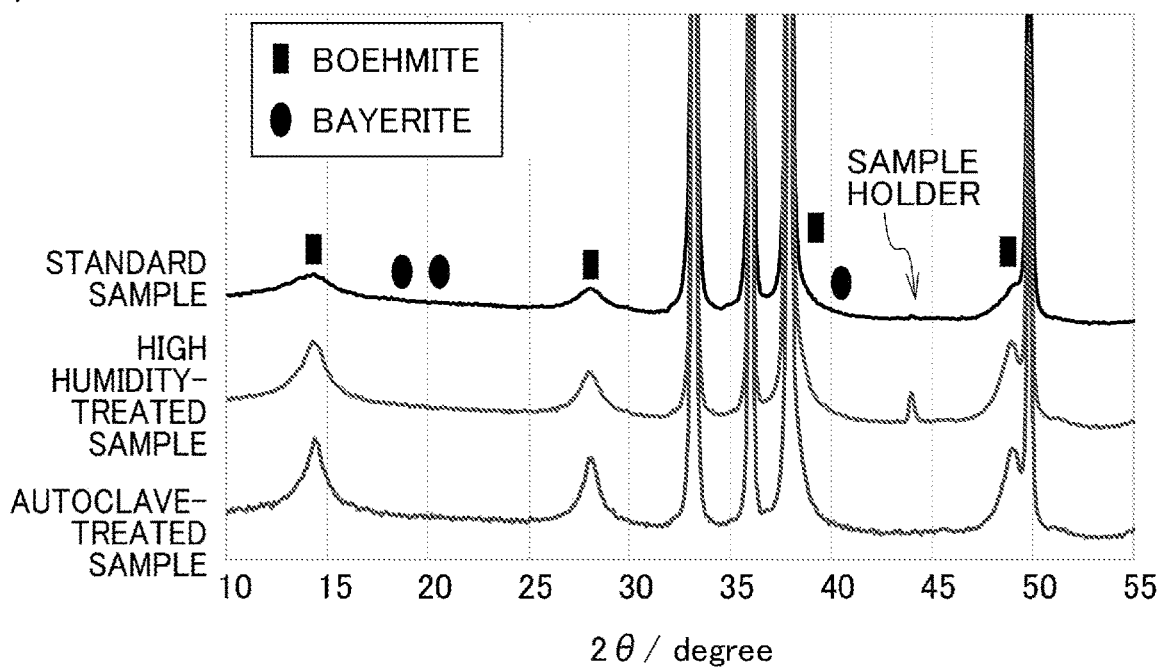

ALUMINUM NITRIDE STRUCTURE AND METHOD FOR PRODUCING SAME

TECHNICAL FIELD

The present invention relates to an aluminum nitride structure and a method for producing the same.

BACKGROUND ART

Aluminum nitride (AlN) has characteristics of high electrical resistance and high dielectric strength and further exhibits a very high thermal conductivity as a ceramic material. Thus, application of aluminum nitride to insulating heat sinks, large-capacity integrated circuit boards, and the like has been considered.

Patent Literature 1 discloses a method for producing a non-calcined solidified body that is enhanced in denseness using AlN, a nitrogen-containing hard-to-sinter powder, for improving thermal characteristics. Specifically, Patent Literature 1 discloses a method for producing a solidified body, the method including a step of solidifying, through a solidification reaction, a nitrogen-containing hard-to-sinter powder to which ammonia water is added. In detail, the solidified body is obtained by performing a step of adding ammonia water to the AlN powder, a step of preparing a slurry through stirring, a step of filtering the slurry, a step of standing the filtered product, a step of further standing the filtered product in a closed system for solidification, and a step of drying the solidified product.

Adding ammonia water to the AlN powder as described above makes a coating film of aluminum hydroxide solution on the surface of the AlN powder. The coating film is then dehydrated through a solidification reaction and drying to become alumina ($Al_2O_3$), AlOOH, or $Al(OH)_3$. Thus, particles of the AlN powder are firmly bound to each other through the alumina coating present among the AlN powder particles to form a solidified body.

CITATION LIST

Patent Literature

Patent Literature 1: Japanese Unexamined Patent Application Publication No. 2019-64844

SUMMARY OF INVENTION

However, since the solidified body is obtained by filtering, standing, and drying a slurry made of AlN powder and ammonia water in Patent Literature 1, there are many pores in the solidified body. Therefore, the denseness of the solidified body decreases, and the strength and hardness are insufficient.

The present invention has been made in consideration of the above issue, which is inherent in the related art. An object of the present invention is to provide an aluminum nitride structure that is enhanced in denseness to have improved mechanical strength and a method for producing the aluminum nitride structure.

In response to the above issue, an aluminum nitride structure according to an aspect of the present invention includes: a plurality of aluminum nitride particles, wherein the plurality of aluminum nitride particles that are adjacent are bound to each other through a boehmite phase containing boehmite, and the aluminum nitride structure has a porosity of 30% or less.

A method for producing an aluminum nitride structure according to an aspect of the present invention includes: obtaining a mixture by mixing an aluminum nitride powder with a solvent containing water; and pressurizing and heating the mixture under conditions of a pressure of 10 to 600 MPa and a temperature of 50 to 300° C.

BRIEF DESCRIPTION OF DRAWINGS

FIG. 3 includes schematic cross-sectional views of the aluminum nitride structure according to the present embodiment. FIG. 3($a$) is a schematic cross-sectional view of a molded body obtained by pressurizing and heating a mixture of an aluminum nitride powder and a water-containing solvent. FIG. 3($b$) is a schematic cross-sectional view of the molded body to which a process of bringing water vapor into contact with the molded body has been performed.

FIG. 4($a$) is a graph illustrating X-ray diffraction patterns of an aluminum nitride powder used in an example 1 and of a test sample 1 obtained in the example 1. FIG. 4($b$) is a graph illustrating a result of enlarging the vertical axis of the graph in FIG. 4($a$).

FIG. 8($a$) is a secondary electron image illustrating a result of observing a cross section of the test sample 1 of the example 1 after being polished, using a scanning electron microscope. FIG. 8($b$) is a graph illustrating a result of a quantitative analysis of aluminum, nitrogen, and oxygen, obtained by performing energy dispersive X-ray spectroscopy (EDX) along the arrow in FIG. 8($a$).

FIG. 11($a$) is a graph illustrating X-ray diffraction patterns of test samples 2 to 5 obtained in an example 2 by varying the pressurization time for a mixture of an aluminum nitride powder and water. FIG. 11($b$) is a graph illustrating a result of enlarging the vertical axis of the graph in FIG. 11($a$).

FIG. 12($a$) is a graph illustrating X-ray diffraction patterns of test samples 6 to 8 obtained in an example 3 by varying the heating temperature for a mixture of an aluminum nitride powder and water. FIG. 12($b$) is a graph illustrating a result of enlarging the vertical axis of the graph in FIG. 12($a$).

FIG. 13($a$) is a graph illustrating X-ray diffraction patterns of a standard sample, a high humidity-treated sample, and an autoclave-treated sample in an example 4. FIG. 13($b$) is a graph illustrating a result of enlarging the vertical axis of the graph in FIG. 13($a$).

DESCRIPTION OF EMBODIMENTS

Figure 1:
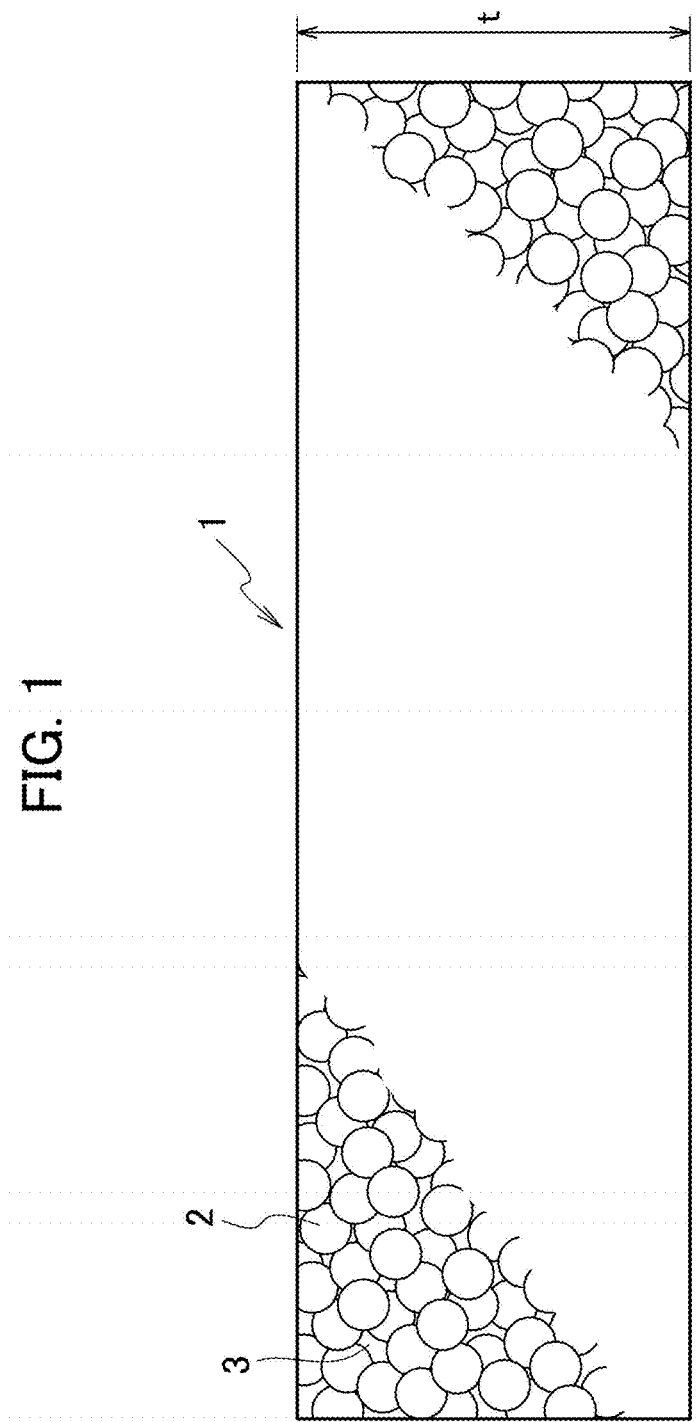
FIG. 1 is a schematic cross-sectional view of an example of an aluminum nitride structure according to a present embodiment.

Referring to the drawings, a description is given below of an aluminum nitride structure and a method for producing an aluminum nitride structure. Note that dimensional ratios in the drawings are exaggerated for convenience of explanation and are sometimes different from actual ratios.

[Aluminum Nitride Structure]

As illustrated in FIG. 1, an aluminum nitride structure 1 according to the present embodiment includes multiple aluminum nitride particles 2. Adjacent aluminum nitride particles 2 are bound to each other to form the aluminum nitride structure 1, which is an aggregate of the aluminum nitride particles 2. There are pores 3 among the adjacent aluminum nitride particles 2.

Figure 2:
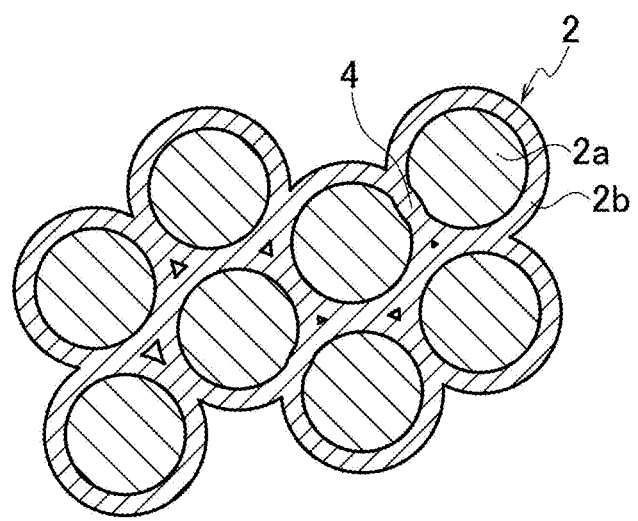
FIG. 2 is a schematic enlarged view of a cross section of the aluminum nitride structure.

As illustrated in FIG. 2, the aluminum nitride particles 2 each have a structure in which the center is an aluminum nitride phase 2a and the surface is a boehmite phase 2b. Adjacent aluminum nitride particles 2 are firmly bound by each having the boehmite phase 2b on the surface contacting each other to form connecting parts 4.

In the aluminum nitride particles 2, the aluminum nitride phase 2a contains aluminum nitride as a main component. That is, the aluminum nitride phase 2a contains aluminum nitride at preferably 50 mol % or more, more preferably 80 mol % or more, particularly preferably 90 mol % or more.

In the aluminum nitride particles 2, the boehmite phase 2b contains boehmite as a main component. That is, the boehmite phase 2b contains boehmite at preferably 50 mol % or more, more preferably 80 mol % or more, particularly preferably 90 mol % or more. Boehmite is an aluminum oxide hydroxide represented by the formula AlOOH. Boehmite is insoluble in water, hardly reacts with acids and alkalis at normal temperature, and thus has high chemical stability. Moreover, boehmite has a high dehydration temperature of around 500° C. and thus has excellent heat resistance. Increasing the content percentage of boehmite in the boehmite phase 2b provides the aluminum nitride structure 1 having excellent chemical stability and heat resistance.

As described above, it is preferable that the boehmite phase 2b of each of the aluminum nitride particles 2 contain boehmite as a main component. However, the boehmite phase 2b may contain aluminum hydroxide ($Al(OH)_3$), such as bayerite, in addition to boehmite. However, since aluminum hydroxide has reactivity to acids and alkalis, when the boehmite phase 2b contains a large amount of aluminum hydroxide, the acid resistance and alkali resistance of the aluminum nitride structure 1 may decrease. Thus, from the viewpoint of enhancing the chemical stability of the aluminum nitride structure 1, it is preferable to reduce the amount of aluminum hydroxide contained in the boehmite phase 2b.

As described above, the aluminum nitride structure 1 includes the aluminum nitride particles 2 each having the aluminum nitride phase 2a at the center and the boehmite phase 2b on the surface. The aluminum nitride particles 2 are bound to each other through boehmite phases 2b, accordingly. That is, the aluminum nitride particles 2 are not bound by an organic binder made from an organic compound nor by an inorganic binder other than the boehmite phase 2b. Moreover, the aluminum nitride structure 1 is formed by heating a mixture of an aluminum nitride powder and water under pressure as described later, and there is no need to use a reaction accelerator or the like. Thus, the aluminum nitride structure 1 does not contain impurities derived from an organic binder, an inorganic binder, or a reaction accelerator, which makes it possible to retain the original characteristics of aluminum nitride and boehmite.

The average particle size of the aluminum nitride particles 2 making up the aluminum nitride structure 1 is not limited. However, the average particle size of the aluminum nitride particles 2 is preferably 300 nm to 50 μm, more preferably 300 nm to 30 μm, particularly preferably 300 nm to 20 μm. When the average particle size of the aluminum nitride particles 2 is within these ranges, the aluminum nitride particles 2 are firmly bound to each other, which enhances the strength of the aluminum nitride structure 1. When the average particle size of the aluminum nitride particles 2 is within these ranges, the percentage of the pores 3 inside the aluminum nitride structure 1 becomes 30% or less as described later, which makes it possible to enhance the strength of the aluminum nitride structure 1. In this description, unless otherwise noted, the "average particle size" is a value calculated as an average in the particle sizes of particles observed in several to tens of visual fields using observation means such as a scanning electron microscope (SEM) or a transmission electron microscope (TEM).

The shape of the aluminum nitride particles 2 is not limited but may be spherical, for example. The aluminum nitride particles 2 may have a whisker shape (needle shape) or a scale shape. The particles having a whisker shape or a scale shape have a higher degree of contact with other particles compared to the particles having a spherical shape, which makes it possible to enhance the strength and thermal conductivity of the entire aluminum nitride structure 1.

Preferably, the aluminum nitride structure 1 has a porosity of 30% or less in cross section. That is, when a cross section of the aluminum nitride structure 1 is observed, the average value in the percentage of the pores 3 per unit area is preferably 30% or less. When the porosity is 30% or less, the proportion of binding in the aluminum nitride particles 2 increases, and the aluminum nitride structure 1 becomes dense to have increased strength. It is thus possible to improve the machinability of the aluminum nitride structure 1. When the porosity is 30% or less, the occurrence of cracks starting from pores 3 in the aluminum nitride structure 1 is prevented, which makes it possible to enhance the bending strength of the aluminum nitride structure 1. Note that the porosity in a cross section of the aluminum nitride structure 1 is preferably 20% or less, more preferably 10% or less, even more preferably 5% or less. The lower the porosity in a cross section of the aluminum nitride structure 1, the more cracks starting from pores 3 are prevented, which makes it possible to enhance the strength of the aluminum nitride structure 1.

In this description, the porosity is determined as follows. First, a cross section of the aluminum nitride structure 1 is observed to discriminate between the aluminum nitride particles 2 and the pores 3. Then, the unit area and the area of the pores 3 in that unit area are measured to obtain the percentage of the pores 3 per unit area, which is defined as the porosity. Note that it is more preferable to obtain the percentage of pores 3 per unit area at multiple locations in a cross section of the aluminum nitride structure 1 and then to define the average value of the percentage of the pores 3 per unit area as the porosity. When a cross section of the aluminum nitride structure 1 is observed, an optical microscope, a scanning electron microscope (SEM), and a transmission electron microscope (TEM) are usable. The unit area and the area of the pores 3 in that unit area may be measured by binarizing an image observed using a microscope.

The size of the pores 3 inside the aluminum nitride structure 1 is not limited but is preferably as small as possible. When the size of the pores 3 is small, cracks starting from the pores 3 are prevented, which makes it possible to enhance the strength of the aluminum nitride structure 1 and to improve the machinability of the aluminum nitride structure 1. Note that the size of the pores 3 in the aluminum nitride structure 1 is preferably 5 μm or less, more preferably 1 μm or less, even more preferably 100 nm or less. The size of the pores 3 inside the aluminum nitride structure 1 is determined by observing a cross section of the aluminum nitride structure 1 using a microscope in the same manner as the porosity described above.

In the aluminum nitride structure 1 according to the present embodiment, the boehmite phase 2b is preferably on the entire surface of each of the aluminum nitride particles 2. Thus, the aluminum nitride particles 2 are bound to each other in three dimensions through each boehmite phase 2b, and thus a bulk body having high mechanical strength is obtained.

Preferably, aluminum nitride structure 1 contains substantially no crystalline aluminum hydroxide. As described above, the aluminum hydroxide has reactivity to acids and alkalis, and when the boehmite phase 2b contains aluminum hydroxide, the acid resistance and alkali resistance of the aluminum nitride structure 1 may decrease. Thus, from the viewpoint of enhancing chemical stability, preferably, the aluminum nitride structure 1 contains substantially no crystalline aluminum hydroxide. Note that in this description, "the aluminum nitride structure contains substantially no crystalline aluminum hydroxide" means that no diffraction peak of aluminum hydroxide is observed when an X-ray diffraction pattern of the aluminum nitride structure is measured.

In the aluminum nitride structure 1, the aluminum nitride phase is present at preferably 50 mass % or more, more preferably 60 mass % or more, even more preferably 70 mass % or more, particularly preferably 80 mass % or more. Increasing the percentage of the aluminum nitride phase provides the aluminum nitride structure 1 having excellent electrical resistance and dielectric strength and also having good thermal conductivity. Note that the percentage of the aluminum nitride phase in the aluminum nitride structure 1 is obtained by measuring the X-ray diffraction pattern of the aluminum nitride structure 1 using an X-ray diffraction method and then performing Rietveld analysis.

Note that in the aluminum nitride structure 1, the ratio of the aluminum nitride phase to the boehmite phase may be suitably adjusted according to a desired function. That is, the proportion of aluminum nitride is preferably high from the viewpoint of high thermal conductivity, and the proportion of boehmite is preferably high from the viewpoint of heat insulation, light weight, and chemical durability. Thus, when the thermal conductivity of the aluminum nitride structure 1 is to be improved, it is preferable to increase the percentage of the aluminum nitride phase. When the heat insulation, light weight, and chemical durability are to be improved, it is preferable to increase the percentage of the boehmite phase.

In the aluminum nitride structure 1, the method for controlling the ratio of the aluminum nitride phase to the boehmite phase is not limited, but the following methods are usable, for example. As described later, the aluminum nitride structure 1 is obtained by performing a step of mixing an aluminum nitride powder with a solvent containing water to obtain a mixture, and a step of pressurizing and heating the mixture under predetermined conditions. As illustrated in FIG. 3(a), in the obtained aluminum nitride structure 1, adjacent aluminum nitride particles 2 are bound to each other through the boehmite phase 2b. Moreover, there are pores 3 among the adjacent aluminum nitride particles 2.

Here, when water vapor is brought into contact with the molded body obtained by pressurizing and heating the mixture of the aluminum nitride powder and the solvent containing water, unreacted aluminum nitride contained in the molded body becomes boehmite, or the boehmite phase 2b on the surface of the aluminum nitride grows. Consequently, it is possible to increase the percentage of the boehmite phase 2b in the aluminum nitride structure 1 as illustrated in FIG. 3(b). Thus, it is possible to control the ratio of the aluminum nitride phase to the boehmite phase by adjusting the contact condition between the molded body and water vapor.

It is sufficient for the aluminum nitride structure 1 to have a structure in which the aluminum nitride particles 2 are bound to each other and the porosity is 30% or less. Thus, as long as the aluminum nitride structure 1 has such a structure, its shape is not limited. The aluminum nitride structure 1 may have, for example, a plate shape, a film shape, a rectangular shape, a lumpy shape, a rod shape, or a spherical shape. When the aluminum nitride structure 1 has a plate shape or a film shape, its thickness t is not limited but may be 50 μm or more, for example. The aluminum nitride structure 1 according to the present embodiment is formed by using a pressure heating method as described later. Thus, the aluminum nitride structure 1 having a large thickness is obtained with ease. Note that the thickness t of the aluminum nitride structure 1 may be 1 mm or more, or 1 cm or more. The upper limit of the thickness t for the aluminum nitride structure 1 is not limited but may be 50 cm, for example.

As described above, the aluminum nitride structure 1 has high mechanical strength because the multiple aluminum nitride particles 2 are firmly bound to each other. Thus, the bending strength of the aluminum nitride structure 1 measured according to Japanese Industrial Standards JIS T6526 (Dental ceramic materials) is preferably 3 MPa or more. Note that the bending strength of the aluminum nitride structure 1 is measured using a biaxial bending strength test method of JIS T6526. When the bending strength is 3 MPa or more, the aluminum nitride structure 1 is excellent in mechanical strength, which enhances the machinability. It is thus possible to use the aluminum nitride structure 1 with ease as a building material requiring high mechanical strength and processability, for example. Note that the bending strength of the aluminum nitride structure 1 is more preferably 10 MPa or more, even more preferably 50 MPa or more. The upper limit of the bending strength for the aluminum nitride structure 1 is not limited but may be 200 MPa, for example.

The aluminum nitride structure 1 preferably has a Vickers hardness of 2 GPa or more measured according to JIS R1610 (Test methods for hardness of fine ceramics). In this case, since the aluminum nitride structure 1 has excellent mechanical strength, it is possible to use the aluminum nitride structure 1 with ease as a building material, for example.

The aluminum nitride structure 1 preferably has a thermal conductivity of 5 W/m·K or more measured according to JIS R1611 (Measurement methods of thermal diffusivity, specific heat capacity, and thermal conductivity for fine ceramics by flash method). In this case, since the aluminum nitride structure 1 has high thermal conductivity, it is possible to suitably use the aluminum nitride structure 1 for an insulating heat sink or a large-capacity integrated circuit board, for example.

Preferably, the aluminum nitride structure 1 has a density of 2.2 g/cm$^3$ or more. As the density of the aluminum nitride structure 1 increases, the pores 3 decrease. This prevents the occurrence of cracks starting from the pores 3 in the aluminum nitride structure 1 and thus makes it possible to improve the mechanical strength of the aluminum nitride structure 1.

As described above, when water vapor is brought into contact with the molded body obtained by pressurizing and heating the mixture of the aluminum nitride powder and the water-containing solvent, it is possible to increase the percentage of the boehmite phase 2b in the aluminum nitride structure 1. The molar mass of aluminum nitride (AlN) is 41 g/mol, and the molar mass of boehmite (AlOOH) is 60 g/mol. The molar volume of aluminum nitride is 12.6 cm³/mol, and the molar volume of boehmite (AlOOH) is 19.5 cm³/mol. Thus, the mass of the aluminum nitride structure 1 increases as the reaction from aluminum nitride to boehmite proceeds, and it is possible to increase the density of the aluminum nitride structure 1. Further, the volume of the boehmite phase 2b in the aluminum nitride structure 1 increases as the reaction from aluminum nitride to boehmite proceeds. Consequently, as illustrated in FIG. 3(*b*), the pores 3 shrink due to the boehmite phase 2b, which makes it possible to enhance the mechanical strength of the aluminum nitride structure 1.

In the aluminum nitride structure 1, it is also preferable that the percentage of the aluminum nitride phase be 70 mass % or less and the percentage of the boehmite phase 2b be 30 mass % or more. Since the shrinkage of the pores 3 due to the boehmite phase 2b is facilitated by making the percentage of the boehmite phase 2b be 30 mass % or more, the aluminum nitride particles are firmly bound to each other, which makes it possible to further enhance the mechanical strength of the aluminum nitride structure 1.

In the aluminum nitride structure 1, a specific surface area measured using a nitrogen adsorption method is preferably 10 m²/g or less. When a BET specific surface area measured using nitrogen gas is 10 m²/g or less, the pores 3 decrease and cracks starting from the pores 3 are prevented, which makes it possible to enhance the strength of the aluminum nitride structure 1. Note that the method for adjusting the BET specific surface area of the aluminum nitride structure 1 is not limited. For example, as described above, it is possible to reduce the specific surface area by increasing the percentage of the boehmite phase 2b by bringing water vapor into contact with the molded body obtained by pressurizing and heating the mixture of the aluminum nitride powder and the water-containing solvent.

In the aluminum nitride structure 1, the multiple aluminum nitride particles 2 are not bound by an organic binder made from an organic compound, nor by an inorganic binder other than the boehmite phase 2b. Thus, in the metallic elements contained in the aluminum nitride structure 1, the content percentage of elements other than aluminum is preferably 5 mass % or less, more preferably 3 mass % or less, even more preferably 1 mass % or less. Since the aluminum nitride structure 1 hardly contains impurities, such as sodium and calcium, it is possible to retain the original characteristics of aluminum nitride and boehmite.

As described above, the aluminum nitride structure 1 according to the present embodiment includes multiple aluminum nitride particles 2, and adjacent aluminum nitride particles 2 are bound to each other through the boehmite phase 2b containing boehmite. The porosity of the aluminum nitride structure is 30% or less. In the aluminum nitride structure 1, the adjacent aluminum nitride particles 2 are bound through the boehmite phase having acid resistance and alkali resistance, which enhances the chemical stability. Further, since the porosity of the aluminum nitride structure is 30% or less, the aluminum nitride particles 2 are arranged in a dense state, which enhances the mechanical strength of the aluminum nitride structure 1. Therefore, the aluminum nitride structure 1 has high machinability.

In contrast, the solidified body described in Patent Literature 1 has many pores inside, and thus the denseness decreases and the strength and hardness are insufficient. Further, since the solidified body contains aluminum hydroxide, the acid resistance and alkali resistance are low, and the chemical stability is insufficient.

Note that as illustrated in FIG. 1, it is possible to form the aluminum nitride structure 1 according to the present embodiment as a structure of only the aluminum nitride particles 2 bound to each other. However, as described later, the aluminum nitride structure 1 is obtained by being pressurized while being heated at a temperature of 50 to 300° C., which makes it possible to add a member having low heat resistance to the aluminum nitride structure 1. Specifically, the aluminum nitride structure 1 may contain organic matter or resin particles in addition to the aluminum nitride particles 2. A member added to the aluminum nitride structure 1 is not limited to one having low heat resistance, such as organic matter, and the aluminum nitride structure 1 may include particles made of metal particles or an inorganic compound.

[Method for Producing Aluminum Nitride Structure]

Next, a method for producing the aluminum nitride structure 1 is described. The aluminum nitride structure 1 is manufactured by performing a step of mixing an aluminum nitride powder with a solvent containing water to obtain a mixture, and a step of pressurizing and heating the mixture.

Specifically, the mixture is prepared by first mixing an aluminum nitride powder with a solvent containing water. Preferably, the solvent containing water is pure water or ion-exchanged water. However, the solvent containing water may contain an acidic substance or an alkaline substance in addition to the water. The solvent containing water may contain water as a main component and may include, for example, an organic solvent, such as alcohol. Further, the solvent containing water may contain ammonia.

The amount of the solvent added to the aluminum nitride is preferably an amount that causes the hydrolysis reaction of the aluminum nitride to proceed and the aluminum hydroxide to be formed on the surface of the aluminum nitride, as described later. The amount of the solvent added is preferably 5 to 100 mass %, more preferably 20 to 80 mass %, per the aluminum nitride.

Non-Patent Literature 1 (Journal of the Japan Institute of Metals and Materials, Vol. 59, No. 11 (1995) 1143-1148, published by the Japan Institute of Metals and Materials) describes that when aluminum nitride reacts with water, its surface is covered with a hydroxyl group, and the reaction product is aluminum hydroxide (Al(OH)$_3$). That is, when aluminum nitride reacts with water, a reaction of the following reaction equation 1 proceeds, and a layer of aluminum hydroxide is formed on the surface of the aluminum nitride.

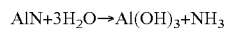

$$AlN+3H_2O \rightarrow Al(OH)_3+NH_3 \qquad \text{[Chem. 1]}$$

Note that when a member having low heat resistance is added to the aluminum nitride structure 1, it is added to the above-described mixture.

Then, the mixture obtained by mixing the aluminum nitride with the solvent containing water is filled in a mold. After being filled with the mixture, the mold is heated as necessary. Applying pressure to the mixture inside the mold causes the inside of the mold to be a high-pressure state. At this time, the aluminum nitride is filled to a high degree, and the particles of the aluminum nitride bind to each other, thereby increasing the density. Specifically, by pressurizing the mixture while heating, the aluminum hydroxide layers formed diffuse toward each other among adjacent aluminum nitride particles, and the aluminum nitride particles are gradually connected to each other. Then, a dehydration reaction proceeds through heating, and the crystal structure changes from aluminum hydroxide to boehmite as in the following reaction equation 2. Consequently, adjacent aluminum nitride particles are bound to each other through a boehmite phase containing boehmite.

$$Al(OH)_3 \rightarrow AlOOH + H_2O \qquad \text{[Chem. 2]}$$

Taking out the molded body from the inside of the mold provides the aluminum nitride structure 1 in which the multiple aluminum nitride particles 2 are bound to each other through the boehmite phase 2b.

The heating and pressurizing condition for the mixture obtained by mixing aluminum nitride with a solvent containing water are not limited as long as the reaction of aluminum nitride with the solvent and the dehydration reaction of aluminum hydroxide proceed. For example, preferably, the mixture is pressurized at a pressure of 10 to 600 MPa while being heated at a temperature of 50 to 300° C. Note that the temperature for heating the mixture is more preferably 80 to 250° C., even more preferably 100 to 200° C. The pressure for pressurizing the mixture is more preferably 50 to 600 MPa, even more preferably 200 to 600 MPa.

The method for producing the aluminum nitride structure 1 according to the present embodiment may further include a step of bringing water vapor into contact with the molded body obtained by performing the step of pressurizing and heating the mixture. When water vapor is brought into contact with the molded body, as illustrated in FIG. 3(b), unreacted aluminum nitride contained in the molded body becomes boehmite, or the boehmite phase 2b on the surface of the aluminum nitride grows. Consequently, it is possible to increase the percentage of the boehmite phase 2b in the aluminum nitride structure 1 and improve the mechanical strength of the aluminum nitride structure 1 as described above.

The conditions for contact with water vapor for the molded body formed by pressurizing and heating the aluminum nitride powder and the water-containing solvent is not limited. For example, water vapor may be brought into contact with the molded body by holding the molded body in a high humidity atmosphere using a constant temperature and constant humidity bath. Water vapor may be brought into contact with the molded body under high pressure using an autoclave.

Here, as a method for forming an aggregate of aluminum nitride, a method for pressing only an aluminum nitride powder is feasible. However, even when the aluminum nitride powder is put into a mold and pressurized at normal temperature, aluminum nitride particles are unlikely to react with each other, and it is difficult to firmly bind the particles together. Thus, there are many pores in the obtained compact, and the mechanical strength is insufficient.

Further, as a method for forming an aggregate of aluminum nitride, a method for forming a compact by pressing only an aluminum nitride powder and then calcining at a high temperature (for example, 1700° C. or higher) is also feasible. When a compact of an aluminum nitride powder is calcined at a high temperature, the aluminum nitride powder is sintered to form a structure. However, even when the aluminum nitride compact is calcined at a high temperature, particles of the aluminum nitride powder are unlikely to sinter with each other, and thus many pores exist in the obtained structure and the mechanical strength is insufficient. Further, when the aluminum nitride powder is calcined at a high temperature, a precise temperature control is necessary, which increases the manufacturing cost.

In contrast, in the manufacturing method according to the present embodiment, a mixture of aluminum nitride and a solvent containing water is heated and pressurized, and thus a dense and strong structure is obtained. In the manufacturing method according to the present embodiment, the structure is obtained by being pressurized while heated at the temperature of 50 to 300° C., which makes it possible to eliminate precise temperature control and to reduce the manufacturing cost.

As described above, the method for producing the aluminum nitride structure 1 according to the present embodiment includes: a step of obtaining a mixture by mixing an aluminum nitride powder with a solvent containing water; and a step of pressurizing and heating the mixture. Preferably, the heating and pressurizing conditions for the mixture are a temperature of 50 to 300° C. and a pressure of 10 to 600 MPa. In the manufacturing method according to the present embodiment, since the heating temperature is low, aluminum nitride is bound through a boehmite phase in the obtained structure. It is thus possible to obtain through a simple method the aluminum nitride structure 1 having excellent mechanical strength and chemical stability.

Note that as described above, in the aluminum nitride structure 1, it is preferable that the percentage of the aluminum nitride phase be high from the viewpoint of high thermal conductivity, high hardness, and high strength, and it is preferable that the percentage of the boehmite phase be high from the viewpoint of heat insulation, light weight, and chemical durability. It is possible to control the percentage of the boehmite phase 2b through the temperature and time of pressurizing the mixture, the amount of the solvent, and conditions of, for example, heat treatment and hydrothermal treatment after molding. Thus, it is also possible to control the characteristics of the entire aluminum nitride structure 1 through process conditions.

[Member Provided with Aluminum Nitride Structure]

Next, a member provided with the aluminum nitride structure 1 is described. As described above, the aluminum nitride structure 1 is formable into a plate shape having a large thickness and is also excellent in chemical stability. The aluminum nitride structure 1 has high mechanical strength, and thus can be cut in the same manner as a general ceramic member and can undergo a surface treatment. Thus, the aluminum nitride structure 1 is suitably used as a building material. The building material is not limited, and possible examples include an exterior wall material (siding), a roof material, and the like. Road materials and outer groove materials are also possible examples of the building material.

The aluminum nitride structure 1 is usable as a member excellent in heat radiation and light weight. Specifically, it is usable as a substrate for a thin film circuit, a substrate for a sensor member and a substrate for a semiconductor process, a ceramic member of a semiconductor manufacturing apparatus, and a housing of general electronic equipment.

EXAMPLES

The present embodiment is described below in more detail with reference to examples, but the present embodiment is not limited to these examples.

Example 1

(Preparation of Test Samples)

First, as aluminum nitride, aluminum nitride powder (purity: 3N) manufactured by Kojundo Chemical Laboratory Co., Ltd. was prepared. An amount of 0.3 g of the aluminum nitride powder and an amount of 0.24 mL of ion-exchanged water were weighed and mixed to obtain a mixture.

Next, the obtained mixture was put into a cylindrical mold (φ 10 mm) having an internal space. Then, test sample 1 according to this example was obtained by heating and pressurizing the mixture under conditions of 400 MPa, 180° C., and 20 minutes.

As a result of measuring the volume and mass of a test sample 1 according to an example 1 and calculating the relative density, the relative density was 72% with respect to the specific gravity d (3.26) of the aluminum nitride.

(X-Ray Diffraction Measurement)

The X-ray diffraction pattern of the test sample 1 obtained as described above was measured using an X-ray diffraction apparatus. FIG. 4 illustrates the X-ray diffraction pattern of the test sample 1 and the X-ray diffraction pattern of the aluminum nitride powder as a raw material. Note that in FIG. 4, a peak derived from a sample holder used in the measurement of X-ray diffractions is also observed.

FIG. 4(a) shows that the aluminum nitride remains in the test sample 1. As illustrated in FIG. 4(b), peaks derived from boehmite were observed in the test sample 1 but were not observed in the aluminum nitride powder as a raw material. In the test sample 1, no peak derived from bayerite (aluminum hydroxide, $Al(OH)_3$) was observed. Therefore, it is shown that the test sample 1 contains boehmite but substantially no crystalline bayerite.

(Thermal Conductivity)

The thermal conductivity of the test sample 1 according to this example was measured according to JIS R1611. As a result of measurement, the thermal conductivity of the test sample 1 was 8.2 W/m·K.

(Vickers Hardness Measurement)

The Vickers hardness of the test sample 1 according to this example was measured according to JIS R1610. As a result of measurement, the Vickers hardness of the test sample 1 was 3.0 GPa.

(Biaxial Bending Strength Measurement)

The bending strength of the test sample 1 according to this example was measured according to JIS T6526. As a result of measurement, the bending strength of the test sample 1 was 120 MPa.

(Electron Microscope Observation)

Figure 5:
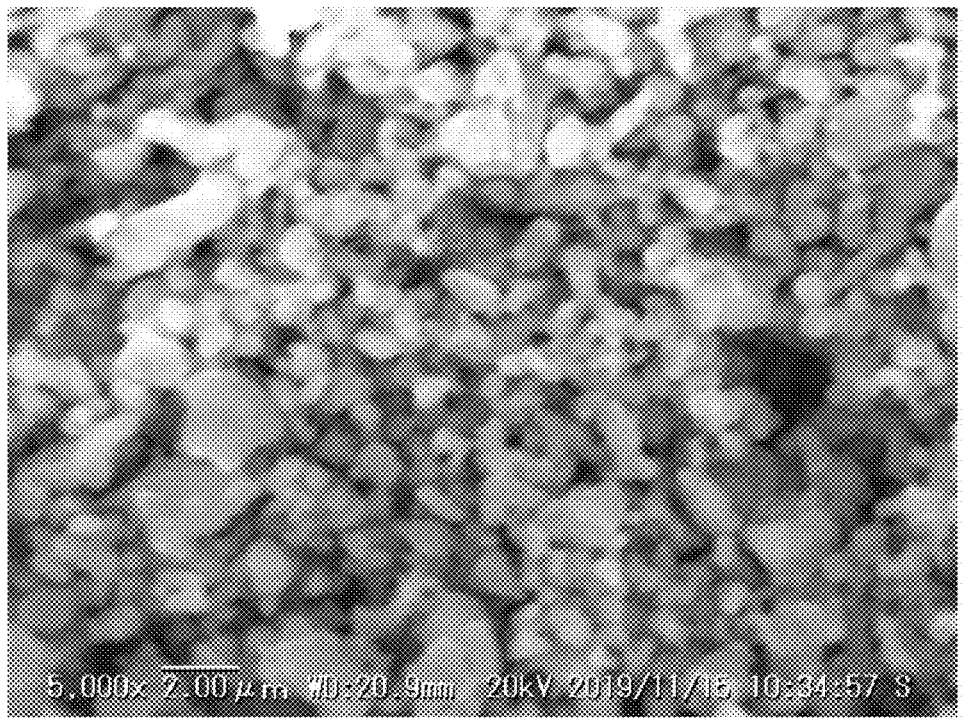
FIG. 5 is a photograph illustrating a result of observing the aluminum nitride powder used in the example 1, using a scanning electron microscope.
Figure 6:
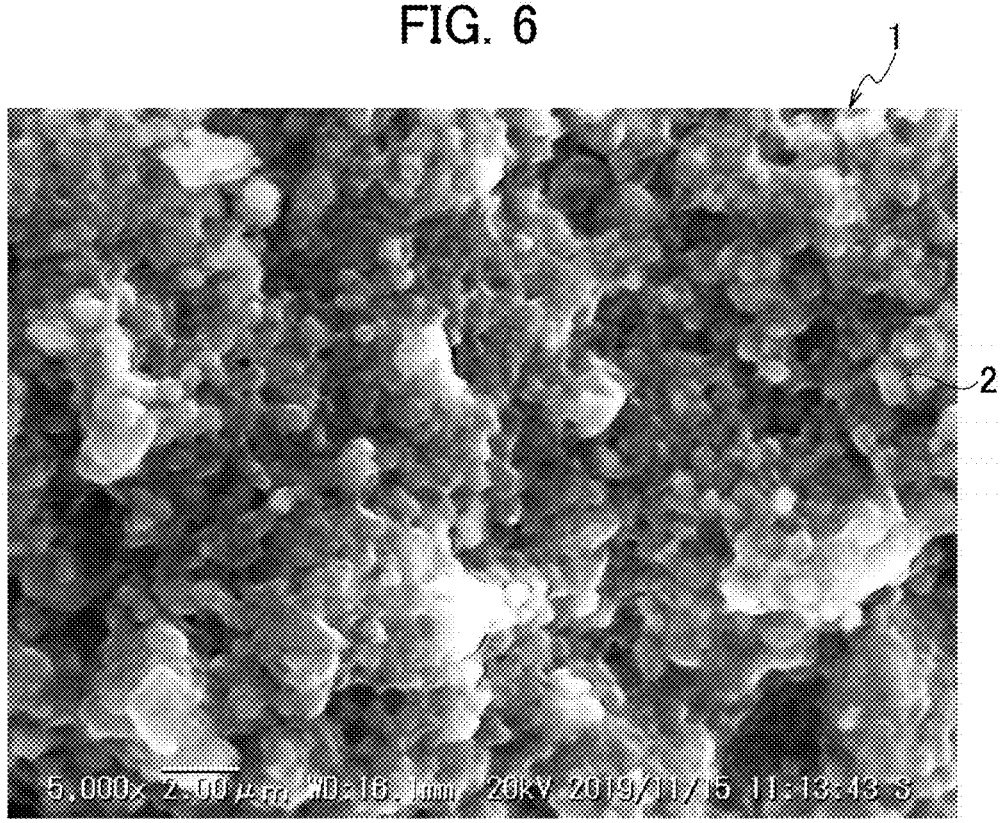
FIG. 6 is a photograph illustrating a result of observing a fracture surface of the test sample 1 obtained in the example 1, using a scanning electron microscope.

A fracture surface of the test sample 1 according to this example was observed using a scanning electron microscope to confirm the presence or absence of binding of aluminum nitride particles. FIG. 5 shows a result of observing the aluminum nitride powder using a scanning electron microscope, and FIG. 6 shows a result of observing the fracture surface of the test sample 1 using a scanning electron microscope.

As illustrated in FIG. 5, it is shown that the particles of the aluminum nitride powder are not bound to each other and are separated from each other. In contrast, as illustrated in FIG. 6, it is confirmed that the particles are bound to each other and solidified in the test sample 1.

Figure 7:
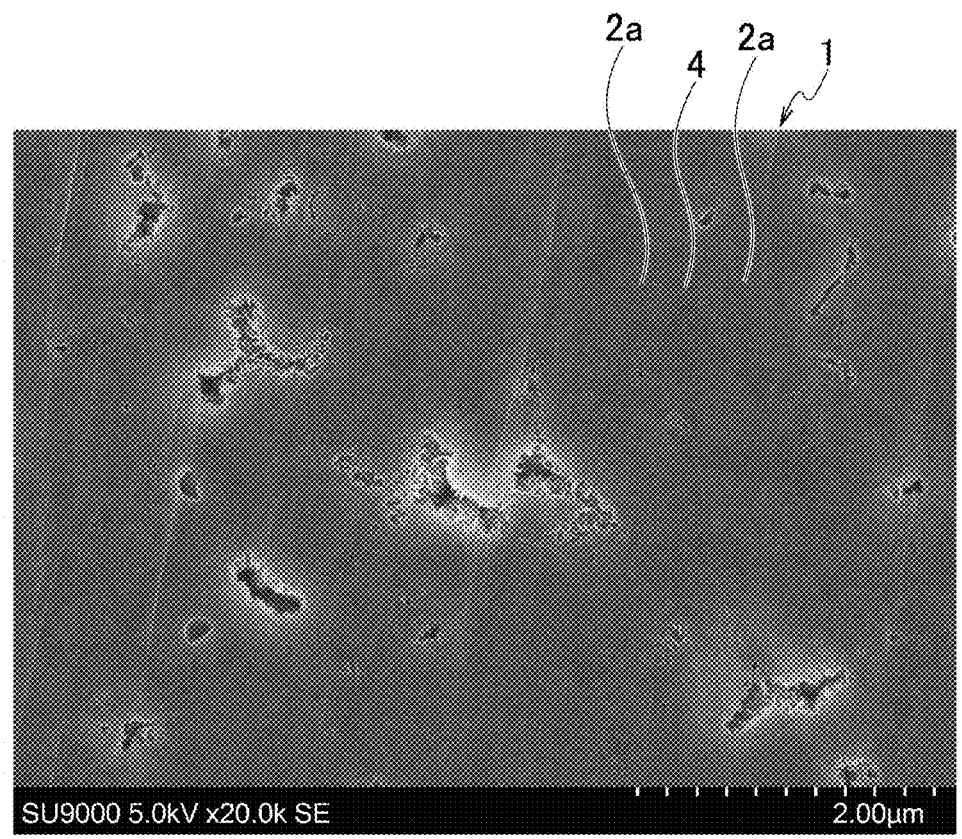
FIG. 7 is a secondary electron image illustrating a result of observing a cross section of the test sample 1 of the example 1 after being polished, using a scanning electron microscope.

Next, a cross section of the test sample 1 according to this example was polished and observed using a scanning electron microscope. Specifically, cross-section polisher processing (CP processing) was applied to the cross section of the test sample 1. Next, a secondary electron image was observed on the cross section of the test sample 1 at a magnification of 20,000 using a scanning electron microscope. As illustrated in FIG. 7, in the test sample 1, it is confirmed that adjacent aluminum nitride phases 2a are bound through the connecting parts 4.

(Energy Dispersive X-Ray Spectroscopy (EDX))

Energy dispersive X-ray spectroscopy was performed on the cross section of the test sample 1 according to this example, and qualitative and quantitative analyses of the elements contained in the cross section were performed. Specifically, cross-section polisher processing was first applied to the cross section of the test sample 1, which was then observed using a scanning electron microscope at a magnification of 50,000. FIG. 8(a) shows a secondary electron image obtained by observing the cross section of the test sample 1.

Moreover, energy dispersive X-ray spectroscopy (line scan) was performed along the arrow in FIG. 8(a) to perform qualitative and quantitative analysis of elements contained in the cross section. The result of the line scan is shown in FIG. 8(b). FIG. 8(b) indicates that the proportion of nitrogen (N) is high and the proportion of oxygen (O) is low in the inside of particles 5. In contrast, it is shown that the proportion of oxygen is high and the proportion of nitrogen is low in the connecting parts 6 among adjacent particles 5. The result indicates that an oxide of aluminum is in the connecting parts 6. That is, it is shown that the adjacent aluminum nitride particles 5 are bound through the oxide of aluminum.

FIGS. 8(a) and 8(b) indicate that a phase of aluminum oxide is on the entire surface of the aluminum nitride particles 5. Thus, it is shown that in the test sample 1, there is a core-shell structure in which the center is an aluminum nitride phase and the surface is an aluminum oxide phase.

As described above, Non-Patent Literature 1 discloses that when aluminum nitride reacts with moisture, its surface is covered with a hydroxyl group, and furthermore, the hydration reaction product thereof is aluminum hydroxide ($Al(OH)_3$). Further, it is confirmed from FIG. 8 that adjacent aluminum nitride particles are bound through the oxide of aluminum, and it is confirmed from FIG. 4 that the test sample 1 contains boehmite. Thus, in the test sample 1, it is shown that adjacent aluminum nitride particles are bound via the boehmite phase formed through dehydration condensation of aluminum hydroxide.

(Porosity Measurement)

Figure 9:
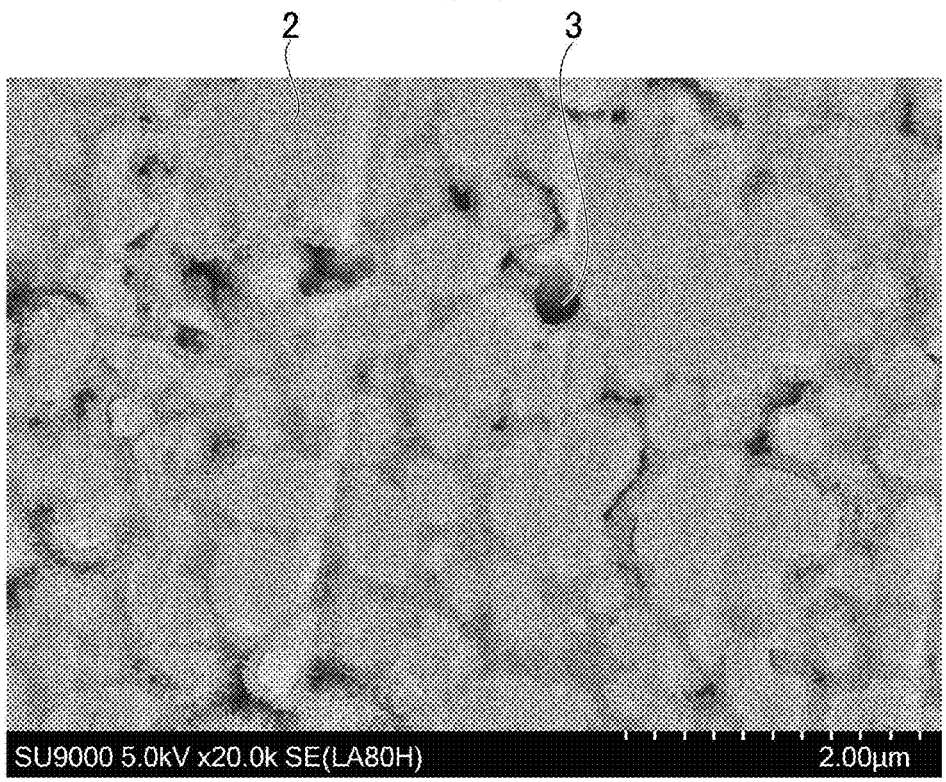
FIG. 9 is a reflected electron image illustrating a result of observing a cross section of the test sample 1 of the example 1 after being polished, using a scanning electron microscope.

First, the cross-section polisher processing was applied to the cross section of the test sample 1 having a cylindrical shape. Next, a reflected electron image of the cross section of the test sample 1 was observed using a scanning electron microscope at a magnification of 20,000. FIG. 9 shows the reflected electron image obtained by observing the cross section of the test sample 1. In the observed reflected electron image, gray particles are aluminum nitride particles 2 and black parts are pores 3.

Figure 10:
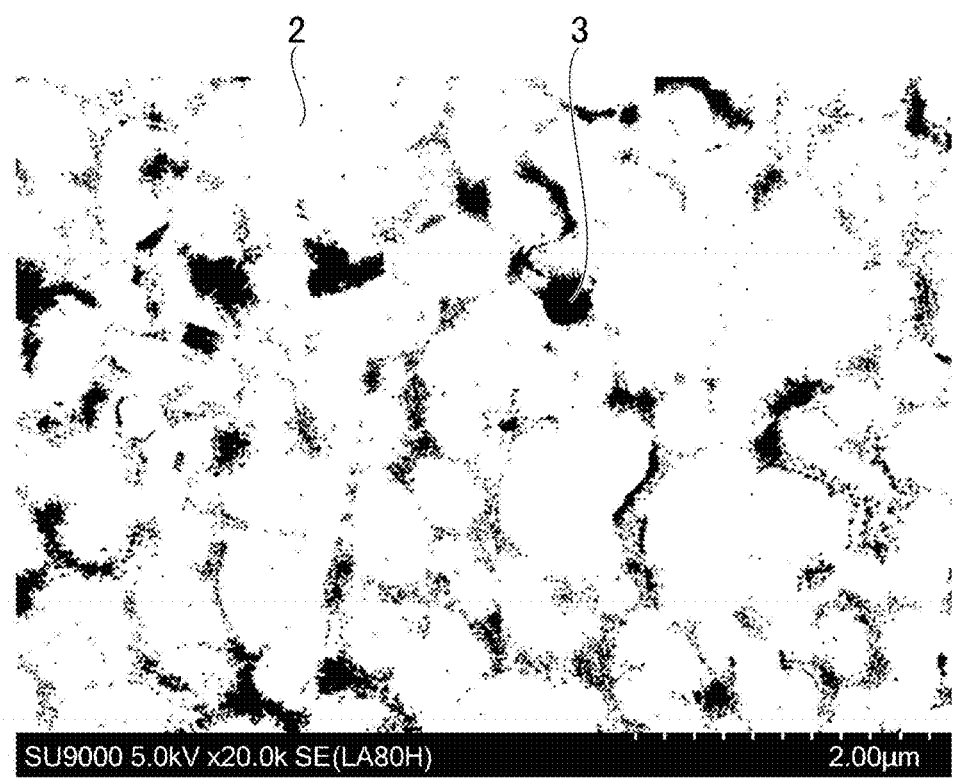
FIG. 10 is a diagram illustrating binarized data of the reflected electron image in FIG. 9.

Next, the SEM image of FIG. 9 was binarized to clarify the pores. An image obtained by binarizing the reflected electron image of FIG. 9 is shown in FIG. 10. Then, the area percentage of the pore part was calculated from the binarized image to obtain the porosity. As a result of calculation, the porosity of the test sample 1 was 9.8%.

Example 2

First, as in the example 1, amounts of 0.3 g of the aluminum nitride powder and 0.24 mL of ion-exchanged water were weighed and mixed to obtain a mixture.

Next, the obtained mixture was put into a cylindrical mold (φ 10 mm) having an internal space. The mixture was then heated and pressurized under conditions of 400 MPa and 180° C. Note that the pressurization time was 5 minutes, 20 minutes, 60 minutes, or 120 minutes. This provided a test sample 2 having a pressurization time of 5 minutes, a test sample 3 having a pressurization time of 20 minutes, a test sample 4 having a pressurization time of 60 minutes, and a test sample 5 having a pressurization time of 120 minutes.

X-ray diffraction patterns of the obtained test samples 2 to 5 were measured using an X-ray diffraction apparatus. FIG. 11 shows the X-ray diffraction patterns of the test samples 2 to 5. From FIG. 11(a), it is shown that aluminum nitride is in the test samples 2 to 5. From FIG. 11(b), it is shown that peaks derived from boehmite were observed in the test samples 2 to 5, which indicates that the aluminum nitride particles are bound through the boehmite phase.

However, as illustrated in FIG. 11(b), in the test sample 2 having the pressurization time of 5 minutes, peaks derived from bayerite were observed to a slight extent in addition to the peaks derived from boehmite. Thus, from the viewpoint of increasing the chemical stability in the aluminum nitride structure by reducing the content of bayerite, it is preferable that the pressurization time during pressing be set longer.

Example 3

First, as in the example 1, amounts of 0.3 g of the aluminum nitride powder and 0.24 mL of ion-exchanged water were weighed and mixed to obtain a mixture.

Next, the obtained mixture was put into a cylindrical mold (φ 10 mm) having an internal space. The mixture was then heated and pressurized under conditions of 400 MPa and 20 minutes. Note that at this time, the pressurization temperature was 95° C., 120° C., or 180° C. This provided a test sample 6 having a heating temperature of 95° C., a test sample 7 having a heating temperature of 120° C., and a test sample 8 having a heating temperature of 180° C.

X-ray diffraction patterns of the obtained test samples 6 to 8 were measured using an X-ray diffraction apparatus. FIG. 12 shows the X-ray diffraction patterns of the test samples 6 to 8. From FIG. 12, peaks derived from boehmite were observed in the test samples 6 to 8, which indicates that the aluminum nitride particles are bound through the boehmite phase.

However, as illustrated in FIG. 12, in the test sample 6 having a heating temperature of 95° C., peaks derived from bayerite were observed to a slight extent in addition to the peak derived from boehmite. Thus, from the viewpoint of increasing the chemical stability in the aluminum nitride structure by reducing the content of bayerite, it is preferable that the heating temperature at the time of pressing be 100° C. or more.

Example 4

(Preparation of Test Samples)

First, as in the example 1, amounts of 0.3 g of the aluminum nitride powder and 0.24 mL of ion-exchanged water were weighed and mixed to obtain a mixture.

Next, the obtained mixture was put into a cylindrical mold (φ 10 mm) having an internal space. The mixture was then heated and pressurized under conditions of 400 MPa, 180° C., and 20 minutes to obtain a standard sample. After the standard sample was dried at 120° C. for 1 hour, the volume and mass of the standard sample were measured to calculate the density, which was 2.34 g/cm³. In the standard sample, the relative density ([density of standard sample]/[specific gravity of aluminum nitride]) with respect to the specific gravity d (3.26) of aluminum nitride was 71.8%.

Further, in the same manner as the standard sample, 0.3 g of the aluminum nitride powder and 0.24 mL of ion-exchanged water were weighed and mixed to obtain a mixture, which was then heated and pressurized under conditions of 400 MPa, 180° C., and 20 minutes to obtain a pellet sample for high humidity treatment. Note that after the pellet sample for high humidity treatment was dried at 120° C. for 1 hour, the volume and mass of the pellet sample were measured to calculate the density, which was 2.24 g/cm³. In the pellet sample for high humidity treatment, the relative density with respect to the specific gravity d of aluminum nitride was 68.6%.

In the same manner as the standard sample, 0.3 g of the aluminum nitride powder and 0.24 mL of ion-exchanged water were weighed and mixed to obtain a mixture, which was then heated and pressurized under conditions of 400 MPa, 180° C., and 20 minutes to obtain a pellet sample for autoclave treatment. Note that after the pellet sample for autoclave treatment was dried at 120° C. for 1 hour, the volume and mass of the pellet sample were measured to calculate the density, which was 2.21 g/cm³. In the pellet sample for autoclave treatment, the relative density with respect to the specific gravity d of aluminum nitride was 67.8%.

(High Humidity Treatment)

A pellet sample for high humidity treatment was left in an atmosphere of 85° C.-85% RH for 24 hours using a constant temperature and constant humidity bath manufactured by ESPEC CORP. Then, the pellet sample was taken out from the constant temperature and constant humidity bath and was dried at 120° C. for 1 hour to obtain a high humidity-treated sample.

Note that the volume and mass of the obtained high humidity-treated sample were measured to calculate the density, which was 2.51 g/cm³. In the high humidity-treated sample, the relative density with respect to the specific gravity d of aluminum nitride was 77.1%.

(Autoclave Treatment)

Using a laboratory autoclave LSX-500 manufactured by TOMY SEIKO CO., LTD., a pellet sample for autoclave treatment was held under a hydrothermal condition of 120° C. and about 0.2 MPa for 1 hour. At this time, the pellet sample was exposed to water vapor without being immersed in liquid water. After the pellet sample was taken out of the autoclave, the pellet sample was dried at 120° C. for 1 hour to obtain an autoclave-treated sample.

Note that the volume and mass of the obtained autoclave-treated sample were measured to calculate the density, which was 2.44 g/cm³. In the autoclave-treated sample, the relative density with respect to the specific gravity d of aluminum nitride was 74.7%.

(Vickers Hardness Measurement)

The Vickers hardness was measured for the standard sample, the high humidity-treated sample, and the autoclave-treated sample obtained as described above. Specifically, the measurement was performed using a micro Vickers hardness tester with a load of 2 kgf and an application time of 15 seconds. The measurement was performed at three or more points for one sample, and the average value was determined as the Vickers hardness of the sample.

Table 1 shows the Vickers hardness of each sample. Note that in Table 1, measured Vickers hardness values are expressed by using "GPa" based on the following conversion formula. Table 1 also shows the density and relative density of each sample in addition to the Vickers hardness of each sample.

1 [HV2]=1/102 [GPa]

HV2 means Vickers hardness with a load of 2 kgf.

TABLE 1

| | Density (g/cm³) | | Relative density (%) | | Vickers hardness (GPa) |
|---|---|---|---|---|---|
| | Before treatment | After treatment | Before treatment | After treatment | |
| Standard sample | 2.34 | — | 71.8 | — | 3.0 (±0.4) |
| High humidity-treated sample | 2.24 | 2.51 | 68.6 | 77.1 | 6.0 (±0.4) |
| Autoclave-treated sample | 2.21 | 2.44 | 67.8 | 74.7 | 5.8 (±0.4) |

(X-Ray Diffraction Measurement)

The X-ray diffraction pattern was measured for the standard sample, the high humidity-treated sample, and the autoclave-treated sample obtained as described above using a powder X-ray diffractometer (MultiFLEX manufactured by Rigaku Corporation). Specifically, after each sample was pulverized in a mortar, the powder was filled in a sample holder, and the X-ray diffraction pattern was measured. FIG. 13 shows the X-ray diffraction patterns of the standard sample, the high humidity-treated sample, and the autoclave-treated sample. Note that in FIG. 13, a peak derived from the sample holder used in the measurement of X-ray diffraction is also observed.

Further, by performing Rietveld analysis on the X-ray diffraction patterns of the standard sample, the high humidity-treated sample, and the autoclave-treated sample, the composition ratio of the aluminum nitride phase to the boehmite phase in each sample was determined. Table 2 shows the composition ratio of each sample.

TABLE 2

| | AlN phase (%) | Boehmite phase (%) |
|---|---|---|
| Standard sample | 82.4 | 17.6 |
| High humidity-treated sample | 62.2 | 37.8 |
| Autoclave-treated sample | 64.4 | 35.6 |

(Specific Surface Area Measurement)

The specific surface area was measured by using a nitrogen adsorption method for the standard sample, the high humidity-treated sample, and the autoclave-treated sample obtained as described above. Specifically, the standard sample, the high humidity-treated sample, and the autoclave-treated sample, which were each in the form of a 10 mm diameter pellet, were divided into 5 to 6 test pieces. About 50 to 60 mg of each sample was taken as a test piece, and nitrogen adsorption and desorption characteristics were evaluated using a gas adsorption amount measuring device (BELSORP-max manufactured by BEL JAPAN, INC.). From the adsorption measurement result, the specific surface area of each sample was determined by performing an analysis using a BET method. Table 3 shows the specific surface area of each sample.

TABLE 3

| | Specific surface area [m²/g] |
|---|---|
| Standard sample | 20.47 |
| High humidity-treated sample | 7.59 |
| Autoclave-treated sample | 2.13 |

(Evaluation)

As shown in Table 1, it is shown that the density and relative density of the high humidity-treated sample and the autoclave-treated sample are larger than those of the standard sample. Further, it is shown that the Vickers hardness of each of the high humidity-treated sample and the autoclave-treated sample increased to nearly twice as much as that of the standard sample.

Further, as illustrated in FIG. 13, it is shown that peaks of boehmite are larger in the high humidity-treated sample and the autoclave-treated sample compared with the standard sample. Furthermore, as shown in Table 2, it is shown that the percentage of the boehmite phase has increased by about 20% in the high humidity-treated sample and the autoclave-treated sample compared with the standard sample. From these, it is shown that boehmite is formed as aluminum nitride reacts with water vapor by applying a high humidity treatment or an autoclave treatment on a molded body obtained by pressurizing and heating a mixture of an aluminum nitride powder and a water-containing solvent.

Further, as shown in Table 3, the specific surface areas of the high humidity-treated sample and the autoclave-treated sample measured by using the nitrogen adsorption method are each 10 m²/g or less. This indicates that micropores having been in the molded body before applying the high humidity treatment or the autoclave treatment are filled through the treatment, and macropores remain.

Here, the molar mass of aluminum nitride (AlN) is 41 g/mol, and the molar mass of boehmite (AlOOH) is 60 g/mol. The molar volume of aluminum nitride is 12.6 cm³/mol, and the molar volume of boehmite is 19.5 cm³/mol. Thus, the reason for the large increase in the densities of the high humidity-treated sample and the autoclave-treated sample is considered to be that the mass of the aluminum nitride structure has increased according to the reaction of aluminum nitride to boehmite. The reason for the large decrease in the specific surface areas of the high humidity-treated sample and the autoclave-treated sample is considered to be that the pores were filled with boehmite according to the reaction of aluminum nitride to boehmite.

From the above, it is considered that the unreacted aluminum nitride becomes boehmite or the boehmite phase 2b on the surface of the aluminum nitride grows, as illustrated in FIG. 3, as the molded body, which is formed by pressurizing and heating the aluminum nitride powder and the water-containing solvent, reacts with water vapor. Consequently, it is considered that the diameter of the pores 3 having existed before applying the water vapor treatment decreased and the specific surface area decreased. Further, it is considered that the increase in mass as the aluminum nitride became boehmite resulted in an increase in sample density. It is considered that since the porosity of the molded body decreases and the boehmite phase 2b increases, the adhesion and binding of the grain boundaries among the aluminum nitride particles 2 are improved, and consequently, the Vickers hardness of the aluminum nitride structure 1 is improved.

Although the present embodiment has been described above, the present embodiment is not limited to these descriptions, and various modifications are possible within the scope of the gist of the present embodiment.

The entire contents of Japanese Patent Application No. 2020-059958 (filed Mar. 30, 2020) are incorporated herein by reference.

INDUSTRIAL APPLICABILITY

According to the present disclosure, it is possible to provide an aluminum nitride structure that is enhanced in denseness to have increased mechanical strength, and a method for producing the aluminum nitride structure.

REFERENCE SIGNS LIST

1 Aluminum nitride structure
2 Aluminum nitride particles
2a Aluminum nitride phase
2b Boehmite phase
3 Pores

What is claimed is:

1. An aluminum nitride structure comprising:
a plurality of aluminum nitride particles,
wherein the plurality of aluminum nitride particles that are adjacent are bound to each other through a boehmite phase containing boehmite, the boehmite phase contains boehmite at 80 mol % or more,
the aluminum nitride particles each having a structure in which a center is an aluminum nitride phase and a surface is the boehmite phase,
as measured by energy dispersive X-ray spectroscopy, a proportion of nitrogen is higher than that of oxygen in the aluminum nitride phase, and a proportion of nitrogen is lower than that of oxygen in the boehmite phase, and
the aluminum nitride structure has a porosity of 30% or less.

2. The aluminum nitride structure according to claim 1, wherein the boehmite phase is present over the entire surface of the plurality of aluminum nitride particles.

3. The aluminum nitride structure according to claim 1, wherein the aluminum nitride structure substantially contains no crystalline aluminum hydroxide.

4. The aluminum nitride structure according to claim 1, wherein the aluminum nitride phase is present at 50 mass % or more.

5. The aluminum nitride structure according to claim 1, wherein the aluminum nitride structure has a density of 2.2 $g/cm^3$ or more.

6. The aluminum nitride structure according to claim 1, wherein the aluminum nitride structure has a specific surface area of 10 $m^2/g$ or less, which is measured using a nitrogen adsorption method.

7. The aluminum nitride structure according to claim 1, wherein the boehmite phase contains boehmite at 90mol % or more.

8. The aluminum nitride structure according to claim 1, wherein the aluminum nitride particles are not bound by an organic binder made from an organic compound nor by an inorganic binder other than the boehmite phase.

9. The aluminum nitride structure according to claim 1, wherein a thickness of the aluminum nitride structure is 1 mm or more.

10. The aluminum nitride structure according to claim 1, wherein a thickness of the aluminum nitride structure is 1 cm or more.

11. The aluminum nitride structure according to claim 1, wherein a bending strength of the aluminum nitride structure measured according to Japanese Industrial Standards JIS T6526 is 3 MPa or more.

12. The aluminum nitride structure according to claim 1, wherein the aluminum nitride structure has a Vickers hardness of 2 GPa or more measured according to JIS R1610.

13. The aluminum nitride structure according to claim 1, wherein the aluminum nitride structure has a thermal conductivity of 5 W/m·K or more measured according to JIS R1611.

14. The aluminum nitride structure according to claim 1, wherein in metallic elements contained in the aluminum nitride structure, a content percentage of elements other than aluminum is 5 mass % or less.

* * * * *